(12) United States Patent
Liu et al.

(10) Patent No.: US 11,740,827 B2
(45) Date of Patent: Aug. 29, 2023

(54) METHOD, ELECTRONIC DEVICE, AND COMPUTER PROGRAM PRODUCT FOR RECOVERING DATA

(71) Applicant: EMC IP Holding Company LLC, Hopkinton, MA (US)

(72) Inventors: Weiyang Liu, Shanghai (CN); Ming Zhang, Shanghai (CN); Qi Wang, Shanghai (CN); Aaron Ren Wang, Shanghai (CN); Yuanyi Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 102 days.

(21) Appl. No.: 16/874,338

(22) Filed: May 14, 2020

(65) Prior Publication Data

US 2021/0303162 A1    Sep. 30, 2021

(30) Foreign Application Priority Data

Mar. 27, 2020  (CN) .......................... 202010231436.7

(51) Int. Cl.
*G06F 3/06* (2006.01)
(52) U.S. Cl.
CPC .............. *G06F 3/065* (2013.01); *G06F 3/064* (2013.01); *G06F 3/067* (2013.01); *G06F 3/0619* (2013.01)
(58) Field of Classification Search
CPC ........ G06F 3/065; G06F 3/0619; G06F 3/064; G06F 3/067
See application file for complete search history.

(56) References Cited

U.S. PATENT DOCUMENTS

| | | | |
|---|---|---|---|
| 10,268,397 B2* | 4/2019 | Anglin | G06F 3/0689 |
| 2015/0040134 A1* | 2/2015 | Leggette | G06F 11/1448 |
| | | | 718/103 |
| 2016/0349993 A1* | 12/2016 | Udupi | G06F 3/0689 |
| 2018/0089027 A1* | 3/2018 | Gray | G06F 3/0619 |

* cited by examiner

Primary Examiner — Jason W Blust
(74) Attorney, Agent, or Firm — WOMBLE BOND DICKINSON (US) LLP

(57) ABSTRACT

The present disclosure relates to a method, an electronic device, and a computer program product for recovering data. For example, a method for recovering data is provided. The method may comprise acquiring metadata corresponding to to-be-recovered target data, the metadata comprising at least a first part of metadata corresponding to a first set of data blocks and a second part of metadata corresponding to a second set of data blocks. The method may further comprise acquiring, based on the first part of metadata, the first set of data blocks from a first backup storage device in a plurality of backup storage devices that store the target data. The method may further comprise acquiring, based on the second part of metadata, the second set of data blocks from a second backup storage device in the plurality of backup storage devices. In addition, the method may further comprise recovering the target data based on at least the first set of data blocks and the second set of data blocks. As such, the utilization of the backup storage devices can be improved and the time for data recovery can be shortened.

18 Claims, 6 Drawing Sheets

US 11,740,827 B2

METHOD, ELECTRONIC DEVICE, AND COMPUTER PROGRAM PRODUCT FOR RECOVERING DATA

CROSS-REFERENCE TO RELATED APPLICATION

This patent application claims priority, under 35 U.S.C. § 119, of Chinese Patent Application No. 202010231436.7, filed Mar. 27, 2020, which is incorporated by reference in its entirety.

TECHNICAL FIELD

Embodiments of the present disclosure generally relate to the field of computer networks, and in particular, to a method, an electronic device, and a computer program product for recovering data.

BACKGROUND

When an exception or failure occurs in a system, a user will generally acquire backup data from a backup storage device. A conventional data backup strategy is to periodically back up data in a user system to a plurality of backup storage devices. The backup storage devices may be of different storage types, may be located in different geographical positions, and may have different storage bandwidths. Once an exception or failure occurs in the user system, the user can select a backup storage device from the plurality of backup storage devices, and acquire backup data from the backup storage device. However, with the development of data information, the size of backup data is increasingly large. Therefore, the process of recovering data generally may take a long time. In addition, since it takes too long time to recover the data, it is likely to lead to poor user experience.

SUMMARY OF THE INVENTION

A method, an electronic device, and a computer program product for recovering data are provided in the embodiments of the present disclosure.

In a first aspect of the present disclosure, a method for recovering data is provided. The method may comprise acquiring metadata corresponding to to-be-recovered target data, the metadata comprising at least a first part of metadata and a second part of metadata. The first part of metadata corresponds to a first set of data blocks in the target data, and the second part of metadata corresponds to a second set of data blocks in the target data. The method may further comprise acquiring, based on the first part of metadata, the first set of data blocks from a first backup storage device in a plurality of backup storage devices that store the target data. The method may further comprise acquiring, based on the second part of metadata, the second set of data blocks from a second backup storage device in the plurality of backup storage devices. In addition, the method may further comprise recovering the target data based on at least the first set of data blocks and the second set of data blocks.

In a second aspect of the present disclosure, an electronic device is provided. The device comprises: at least one processing unit; and at least one memory coupled to the at least one processing unit and storing instructions configured to be executed by the at least one processing unit, wherein when executed by the at least one processing unit, the instructions cause the device to perform actions comprising: acquiring metadata corresponding to to-be-recovered target data, the metadata comprising at least a first part of metadata corresponding to a first set of data blocks in the target data and a second part of metadata corresponding to a second set of data blocks in the target data; acquiring, based on the first part of metadata, the first set of data blocks from a first backup storage device in a plurality of backup storage devices that store the target data; acquiring, based on the second part of metadata, the second set of data blocks from a second backup storage device in the plurality of backup storage devices; and recovering the target data based on at least the first set of data blocks and the second set of data blocks.

In a third aspect of the present disclosure, a computer program product is provided. The computer program product is tangibly stored in a non-transitory computer storage medium and comprises machine-executable instructions. When executed by the device, the machine-executable instructions cause a device to perform any step of the method described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, the same reference numerals generally represent the same members.

In the drawings, the same or corresponding reference numerals represent the same or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be appreciated that the present disclosure may be implemented in various forms and should not be limited by the embodiments described here. In contrast, the embodiments are provided to make the present disclosure more thorough and complete, and the scope of the present disclosure may be fully conveyed to those skilled in the art.

The term "include" and its variants as used herein indicate open inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, in a conventional process of recovering backup data, a user is generally prompted to select a backup storage device from a plurality of backup storage devices for data recovery. However, the process of recovering the data may take hours or even dozens of hours. At the same time, except the backup storage devices selected for data recovery, other backup storage devices are all in an idle state, and these idle backup storage devices do not carry out daily data backup in the process of data recovery, which also causes a waste of resources. How to reasonably utilize all available backup storage devices for data recovery is a problem to be solved urgently at present.

In order to solve the above problem and improve user experience, a mechanism of recovering data by using at least two backup storage devices is proposed in an example embodiment of the present disclosure, which can assign a task of data recovery to each backup storage device more reasonably, so that the utilization of each backup storage device can be improved as much as possible to reduce the time required for recovering data.

Figure 1:
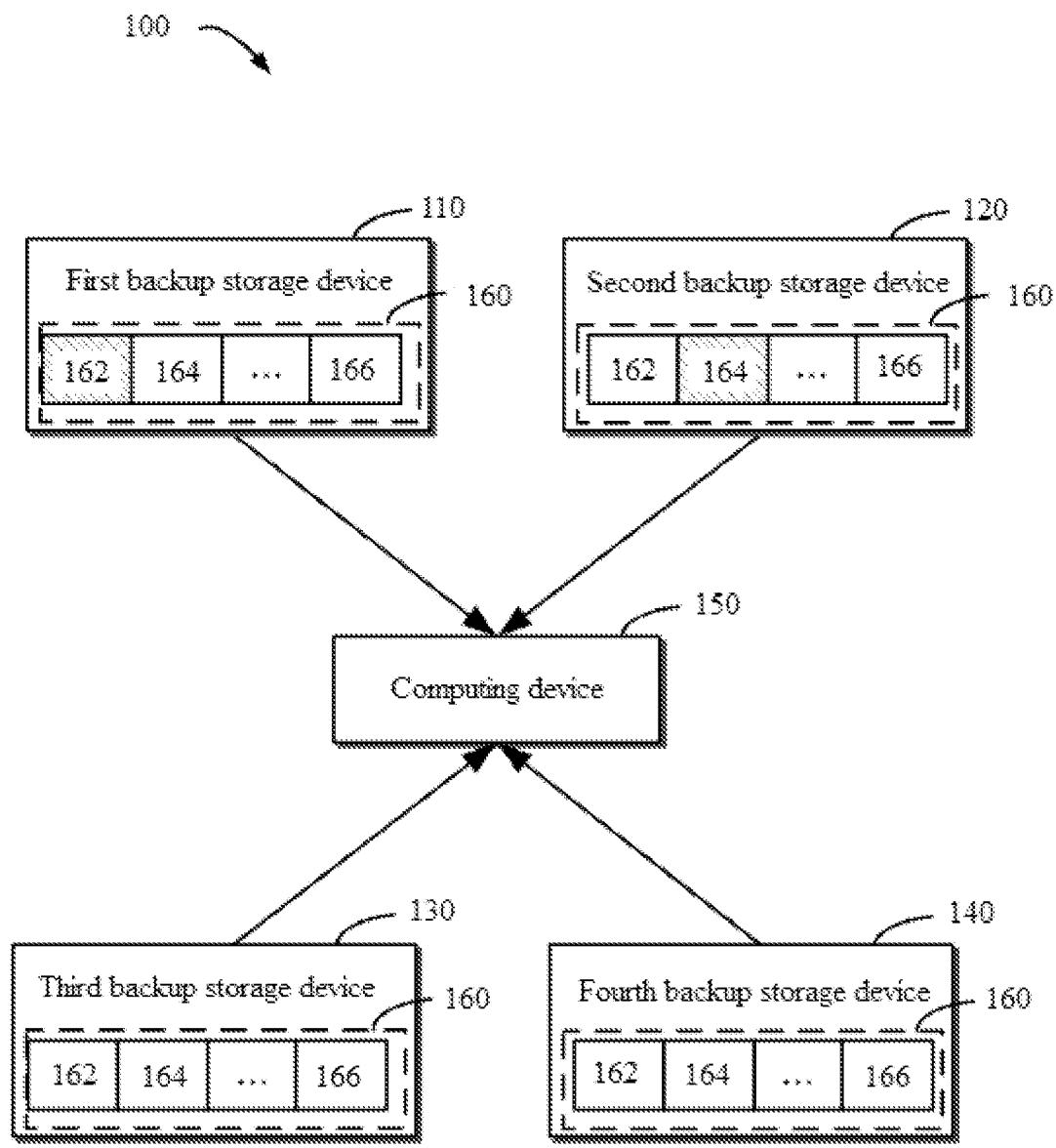
FIG. 1 is a schematic diagram of an example environment in which an embodiment of the present disclosure can be implemented.

FIG. 1 is a schematic diagram of example environment 100 in which an embodiment of the present disclosure can be implemented. A plurality of backup devices 110, 120, 130, and 140 are illustrated in example environment 100. Data 160 is backed up in all backup storage devices 110-140, and backup storage devices 110-140 can provide part or all of data 160 for computing device 150. In the embodiment shown in FIG. 1, computing device 150 acquires different parts of data 160 from backup storage devices 110-140, so as to recover data 160. For computing device 150, data 160 is to-be-recovered data, so data 160 is also referred to as "target data 160" in the embodiment of the present disclosure.

In the embodiment shown in FIG. 1, computing device 150 acquires different data parts from backup storage devices 110 and 120 respectively, for recovering data 160. For ease of description, in the following, backup storage device 110 is also referred to as first backup storage device 110, and backup storage device 120 is also referred to as second backup storage device 120. It should be appreciated that the above example only describes the present disclosure, instead of specifically limiting the present disclosure. In another embodiment of the present disclosure, computing device 150 can recover data 160 by using any two or more backup devices in backup devices 110-140.

As shown in FIG. 1, target data 160 may include a plurality of data parts 162, 164, 166, etc., each of which may include a set of data blocks, for example, one or more data blocks. For ease of description, in the following, data part 162 is also referred to as first set of data blocks 162, and data part 164 is also referred to as second set of data blocks 164. In the embodiment of FIG. 1, first backup storage device 110 and second backup storage device 120 are respectively responsible for one of the data recovery tasks. Therefore, backup storage device 110 can provide first set of data blocks 162 to computing device 150, and at the same time, second backup storage device 120 can provide second set of data blocks 164 to computing device 150. Then, computing device 150 can recover data 160 based on at least first set of data blocks 162 and second set of data blocks 164. For example, computing device 150 may also acquire data part 166 (also referred to as third set of data blocks 166) from backup storage device 130, so that data 160 can be recovered based on first set of data blocks 162, second set of data blocks 164, and third set of data blocks 166, and so on.

In some embodiments, computing device 120 may include, but is not limited to, a personal computer, a server computer, a handheld or laptop device, a mobile device (such as a mobile phone, a personal digital assistant (PDA), or a media player), a multiprocessor system, a consumer electronic product, a minicomputer, a mainframe computer, a distributed computing environment including any of the above systems or devices, and so on.

In the embodiment of FIG. 1, data recovery is completed in units of data blocks, and each data block has metadata representing its related information. First backup storage device 110 and second backup storage device 120 can jointly complete the data recovery by acquiring metadata of to-be-recovered data from first backup storage device 110 and/or second backup storage device 120 and dividing the metadata into two parts corresponding to first backup storage device 110 and second backup storage device 120 respectively. As such, the data recovery no longer requires a long wait, thus saving a lot of time and human resources.

It should be appreciated that the environment shown in FIG. 1 is only an example instead of a specific limitation to the present disclosure. The number and structure of the members and the arrangement of the environment in the embodiment shown in FIG. 1 are examples for the purpose of description and are not intended to make any limitation to the present disclosure.

Figure 2:
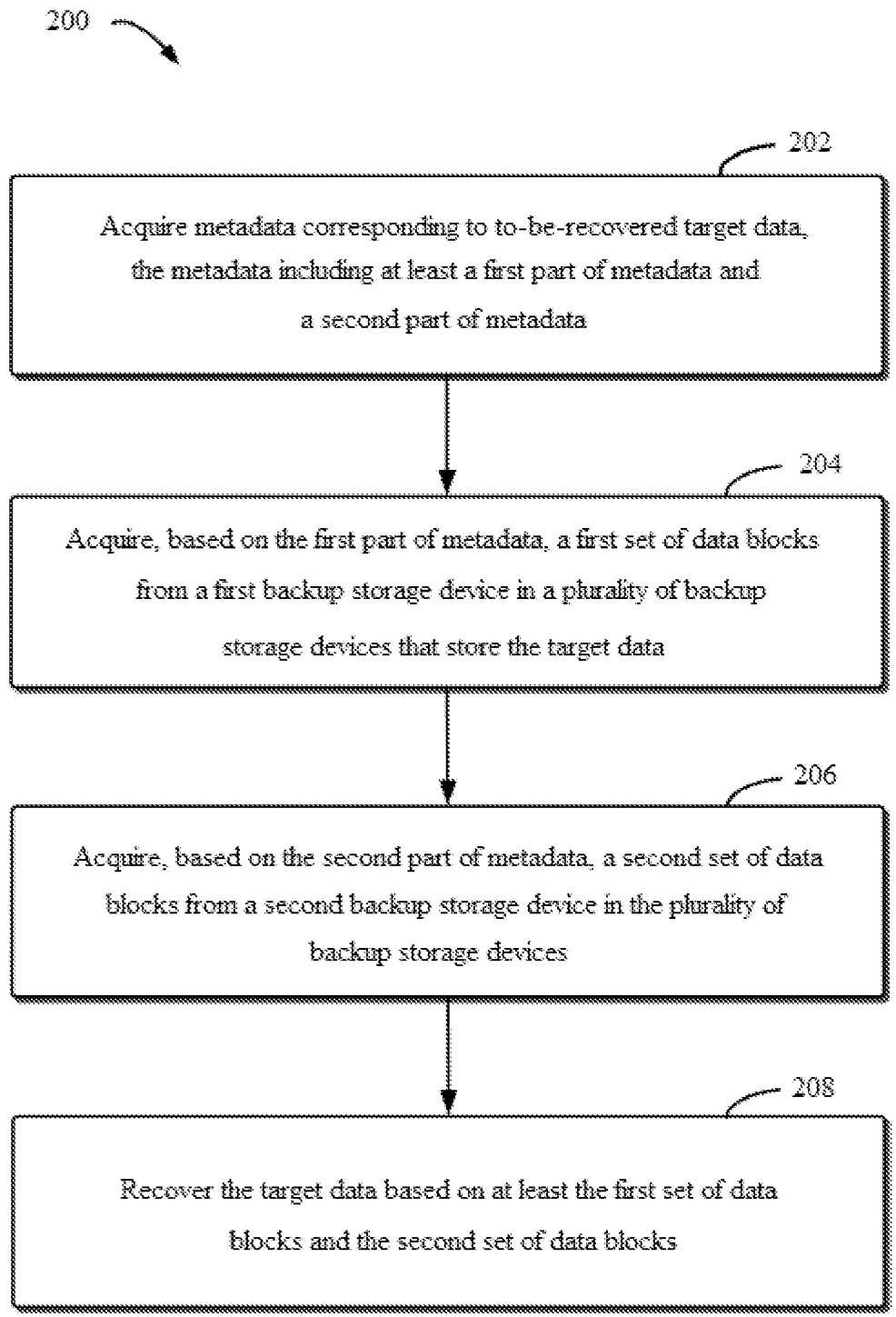
FIG. 2 is a flowchart of a process for recovering data according to an embodiment of the present disclosure.

FIG. 2 is a flowchart of process 200 for recovering data according to an embodiment of the present disclosure. In some embodiments, process 200 may be performed by computing device 150 in FIG. 1. As an example, process 200 may be implemented in example environment 100 shown in FIG. 1. Process 200 for recovering data according to an embodiment of the present disclosure is described now with reference to FIG. 2. For ease of understanding, specific circumstances mentioned in the following description are all exemplary, and are not intended to limit the protection scope of the present disclosure.

In 202, computing device 150 can acquire metadata corresponding to to-be-recovered target data, the metadata including at least a first part of metadata and a second part of metadata. As an example, the computing device can acquire metadata of the target data from one of first backup storage device 110 and second backup storage device 120, and divide the metadata into the first part of metadata and the second part of metadata. The first part of metadata corresponds to first set of data blocks 162 in the target data, and the second part of metadata corresponds to second set of data blocks 164 in the target data. As such, the metadata is divided into a plurality of parts in computing device 150, thus enabling a plurality of backup storage devices to jointly complete the data recovery task.

In 204, computing device 150 can acquire, based on the first part of metadata, first set of data blocks 162 from first backup storage device 110 in a plurality of backup storage devices that store the target data. In some embodiments, computing device 150 can first select a backup storage device meeting a particular requirement and assign the first part of metadata to the backup storage device as a task, thus acquiring first set of data blocks 162.

Figure 3:
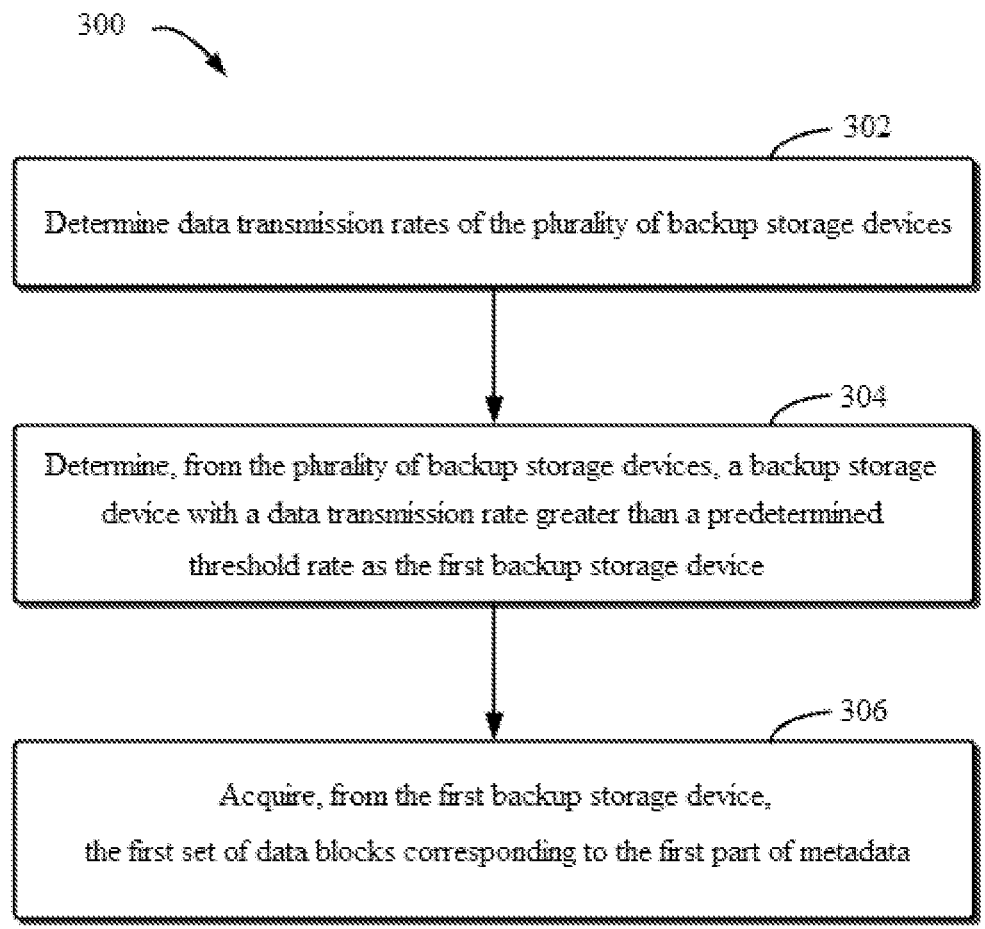
FIG. 3 is a flowchart of an example process for acquiring a first set of data blocks according to an embodiment of the present disclosure.

Specifically, FIG. 3 is a flowchart of example process 300 for acquiring first set of data blocks 162 according to an embodiment of the present disclosure. In some embodiments, process 300 may be performed by computing device 150 in FIG. 1. As an example, process 300 may be implemented in example environment 100 shown in FIG. 1. Process 300 for acquiring first set of data blocks 162 according to an embodiment of the present disclosure is described now with reference to FIG. 3. For ease of understanding, specific circumstances mentioned in the following description are all exemplary, and are not intended to limit the protection scope of the present disclosure.

In 302, computing device 150 can determine data transmission rates of a plurality of backup storage devices. As an example, computing device 150 can initiate a particular directive to calculate the data transmission rates of the backup storage devices.

In 304, computing device 150 can determine, from the plurality of backup storage devices, a backup storage device with a data transmission rate greater than a predetermined threshold rate as first backup storage device 110. In other words, computing device 150 can select, from the plurality of backup storage devices, several backup storage devices with high data transmission rates based on the number of parts into which the metadata is divided. As such, the rate of data recovery can be maximized.

In 306, computing device 150 can acquire, from first backup storage device 110, first set of data blocks 162 corresponding to the first part of metadata. In other words, when computing device 150 assigns a data transmission task corresponding to the first part of metadata to first backup storage device 110, first backup storage device 110 can complete a part of the data transmission task. If computing device 150 divides the metadata of the to-be-recovered data into several or even more parts, several or even more backup storage devices with high data transmission rates can also be selected from the plurality of backup storage devices. It should be appreciated that the number of the plurality of backup storage devices selected is not necessarily equal to the number of parts into which the metadata is divided. When the number of the backup storage devices is less than the number of parts into which the metadata is divided, the backup storage devices can complete the divided parts of metadata sequentially.

It should also be appreciated that in addition to the above manner of determining the data transmission rates, computing device 150 can also acquire first set of data blocks 162 by selecting a candidate storage device through determination of geographical distances. As an example, computing device 150 can first determine geographical positions of the plurality of backup storage devices and then determine, from the plurality of backup storage devices, a backup storage device from which a distance to the system for recovering the target data is greater than a predetermined threshold distance as first backup storage device 110, and finally computing device 150 can acquire first set of data blocks 162 corresponding to the first part of metadata from first backup storage device 110.

Alternatively or additionally, a candidate storage device can also be assigned in sequence to each piece of metadata corresponding to each data block in the metadata. As an example, if two candidate storage devices, namely, first candidate storage device 110 and second candidate storage device 120 are selected, a first piece of metadata can be assigned to be corresponding to first candidate storage device 110, a second piece of metadata can be assigned to be corresponding to second candidate storage device 120, a third piece of metadata can be assigned to be corresponding to first candidate storage device 110, a fourth piece of metadata can be assigned to be corresponding to second candidate storage device 120, and so on in sequence.

Referring back to FIG. 2, in 206, computing device 150 can acquire, based on the second part of metadata, second set of data blocks 164 from second backup storage device 120 in the plurality of backup storage devices. In some embodiments, in order to further accelerate the process of data recovery, computing device 150 instructs a backup storage device that has completed the corresponding data recovery task to continue to perform tasks that have not been completed by other backup storage devices.

Figure 4:
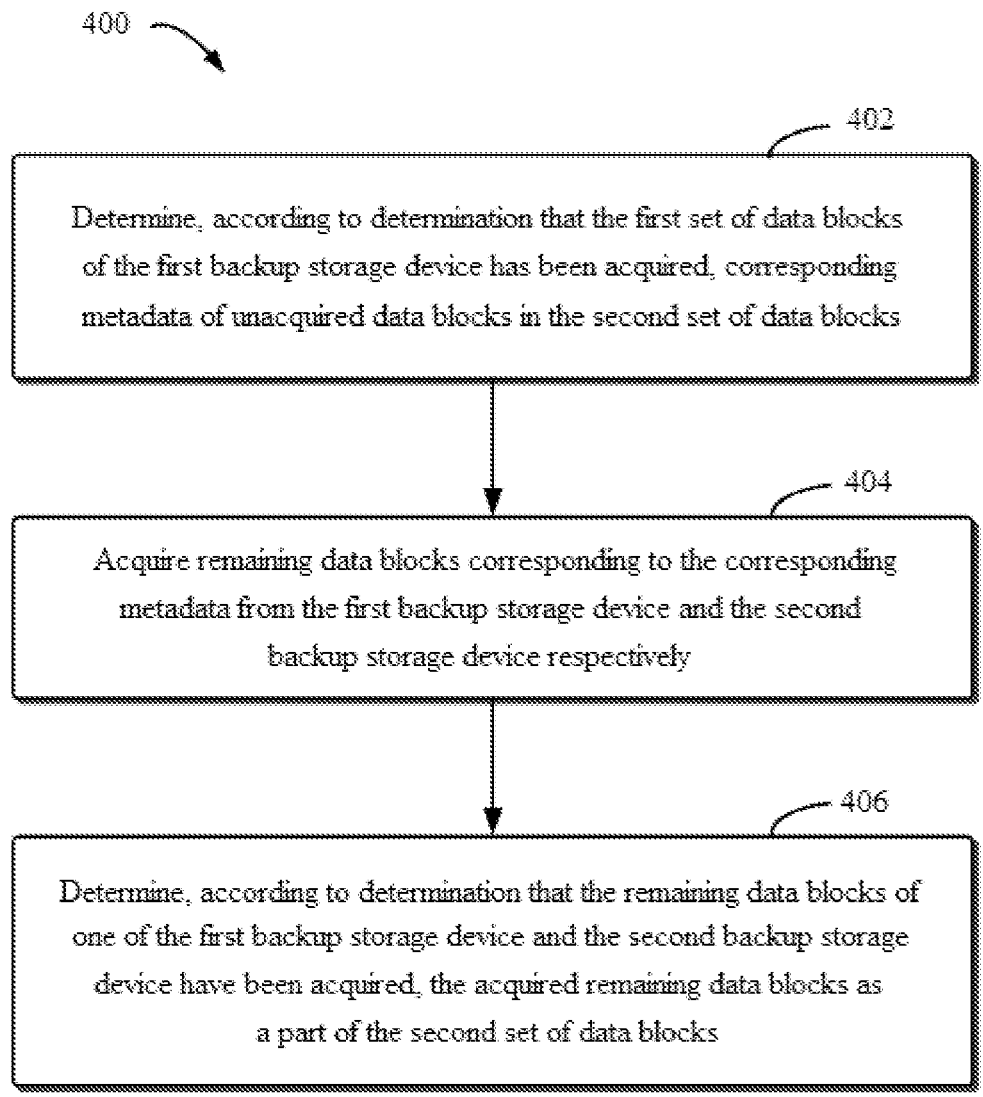
FIG. 4 is a flowchart of an example process for acquiring a second set of data blocks according to an embodiment of the present disclosure.

Specifically, FIG. 4 is a flowchart of example process 400 for acquiring second set of data blocks 164 according to an embodiment of the present disclosure, which illustrates a specific process for acquiring second set of data blocks 164. In some embodiments, process 400 may be performed by computing device 150 in FIG. 1. As an example, process 400 may be implemented in example environment 100 shown in FIG. 1. Process 400 for acquiring second set of data blocks 164 according to an embodiment of the present disclosure is described now with reference to FIG. 4. For ease of understanding, specific data mentioned in the following description is all exemplary, and is not intended to limit the protection scope of the present disclosure.

In 402, computing device 150 can first determine whether first backup storage device 110 has provided all of first set of data blocks 162. After it is determined that all of first set of data blocks 162 of first backup storage device 110 has been acquired, computing device 150 can determine corresponding metadata of unacquired data blocks in other data blocks such as second set of data blocks 164. As an example, after detecting that a backup storage device has completed the assigned data recovery task, computing device 150 can determine uncompleted tasks of other backup storage devices at the time node, i.e., unacquired data blocks. Then, computing device 150 determines corresponding metadata based on the unacquired data blocks.

In 404, computing device 150 can acquire remaining data blocks corresponding to the corresponding metadata from first backup storage device 110 and second backup storage device 120, respectively. In other words, the task uncompleted by second backup storage device 120 can be assigned to first backup storage device 110 and second backup storage device 120, respectively.

In 406, computing device 150 can determine, according to determination that remaining data blocks of one of first backup storage device 110 and second backup storage device 120 have been acquired, the acquired remaining data blocks as a part of second set of data blocks 164. In other words, first backup storage device 110 and second backup storage device 120 can compete, and remaining data blocks provided by the backup storage device in first backup storage device 110 and second backup storage device 120 which first completes the task can be used as unacquired data blocks in second set of data blocks 164 to become a part of second set of data blocks 164. As such, the backup storage devices can be further fully utilized, thus further optimizing the efficiency of data recovery.

Referring back to FIG. 2, in 208, computing device 150 can recover the target data based on at least first set of data blocks 162 and second set of data blocks 164. Since first set of data blocks 162 and second set of data blocks 164 are both acquired based on the metadata, first set of data blocks 162 and second set of data blocks 164 can be directly used as the target data.

As such, a data recovery task can be divided into several parts, and then the data recovery tasks can be assigned based on the performance of the backup storage devices. The various storage devices are fully utilized, and therefore, the efficiency of data recovery can be maximized.

In some embodiments, process 200 can further include: if it is found that one of first set of data blocks 162 is not received correctly, that is, a particular data block cannot be copied from first backup storage device 110, computing device 150 can determine metadata of the data block, and acquire the data block from second backup storage device 120 based on the metadata of the data block. As such, when individual data blocks cannot be recovered normally, or data transmission is interrupted due to the damage of the individual data blocks, it is unnecessary to retransmit the whole data or a part thereof, and it is only necessary to acquire the data blocks from another backup storage device and recover the target data based on the acquired data blocks.

Figure 5:
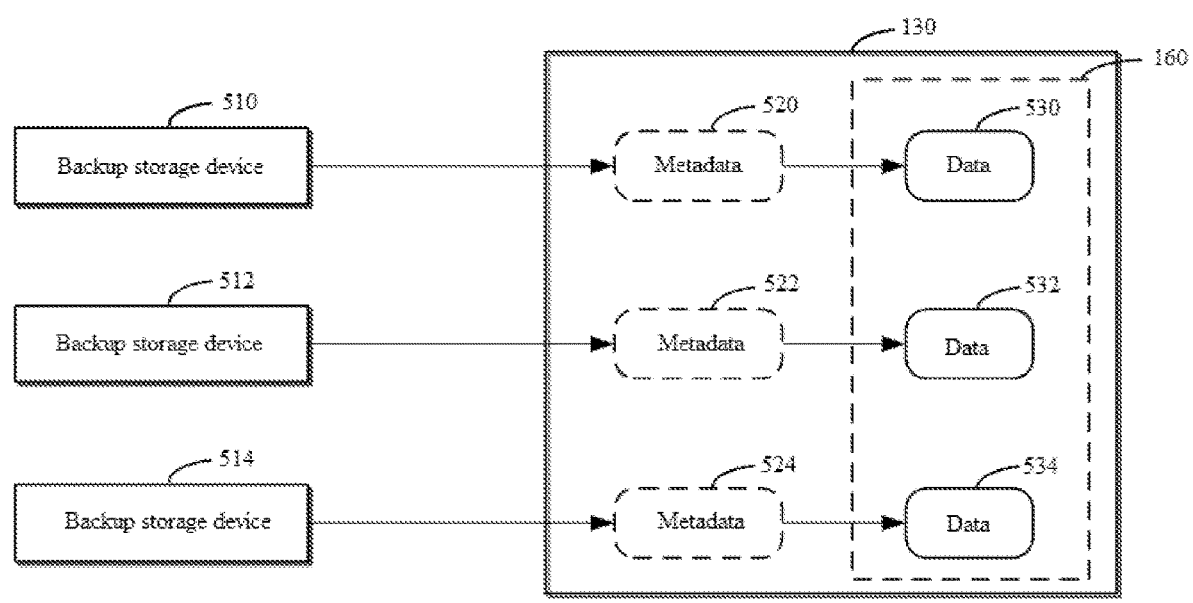
FIG. 5 is a schematic diagram of simultaneously recovering data from a plurality of backup storage devices according to an embodiment of the present disclosure.

In order to describe the preferred embodiments of the present disclosure more clearly, FIG. 5 is a schematic diagram of simultaneously recovering data from a plurality of backup storage devices according to an embodiment of the present disclosure. As shown in FIG. 5, backup storage devices 510, 512, and 514 are all configured to back up target data. As an example, backup storage device 510 may be a storage device close to a user system (for example, in the same city as the user system), backup storage device 512 may be a storage device far away from the user system (for example, in a different city from the user system), and backup storage device 514 may be a cloud storage device.

Computing device 150 selects, by detection, backup storage devices 510, 512, and 514 to jointly complete a data backup task. After computing device 150 acquires metadata of the target data from at least one of backup storage devices 510, 512, and 514, computing device 150 can divide the metadata into metadata 520, 522, and 524 and make them correspond to backup storage devices 510, 512, and 514 respectively. Therefore, backup storage device 510 can provide partial data 530 to computing device 150 based on metadata 520. Backup storage device 512 can provide partial data 532 to computing device 150 based on metadata 522. Backup storage device 514 can provide partial data 534 to computing device 150 based on metadata 524. Partial data 530, 532, and 534 may be a part of data 160, for example, each may include one or more data blocks and the number of data blocks included in each may be different. After receiving partial data 530, 532, and 534, computing device 150 can recover data 160 based on partial data 530, 532, and 534.

According to the above embodiment, metadata of target data can be recovered from any candidate storage device first, a data recovery task is then divided into several parts based on the metadata, and a plurality of backup storage devices are instructed to complete one or more parts in the several parts respectively, thus enabling the plurality of backup storage devices to jointly complete the data recovery task. In addition, in order to further accelerate the speed of data transmission and improve the speed of data recovery, a backup storage device with a higher data transmission rate and close to a geographical position of the user system is preferably selected in the embodiment of the present disclosure. Moreover, in order to make full use of each backup storage device, when one backup storage device completes the corresponding task, tasks not completed by other backup storage rates can also be assigned to the backup storage device, thus further improving the work efficiency of the backup system.

Figure 6:
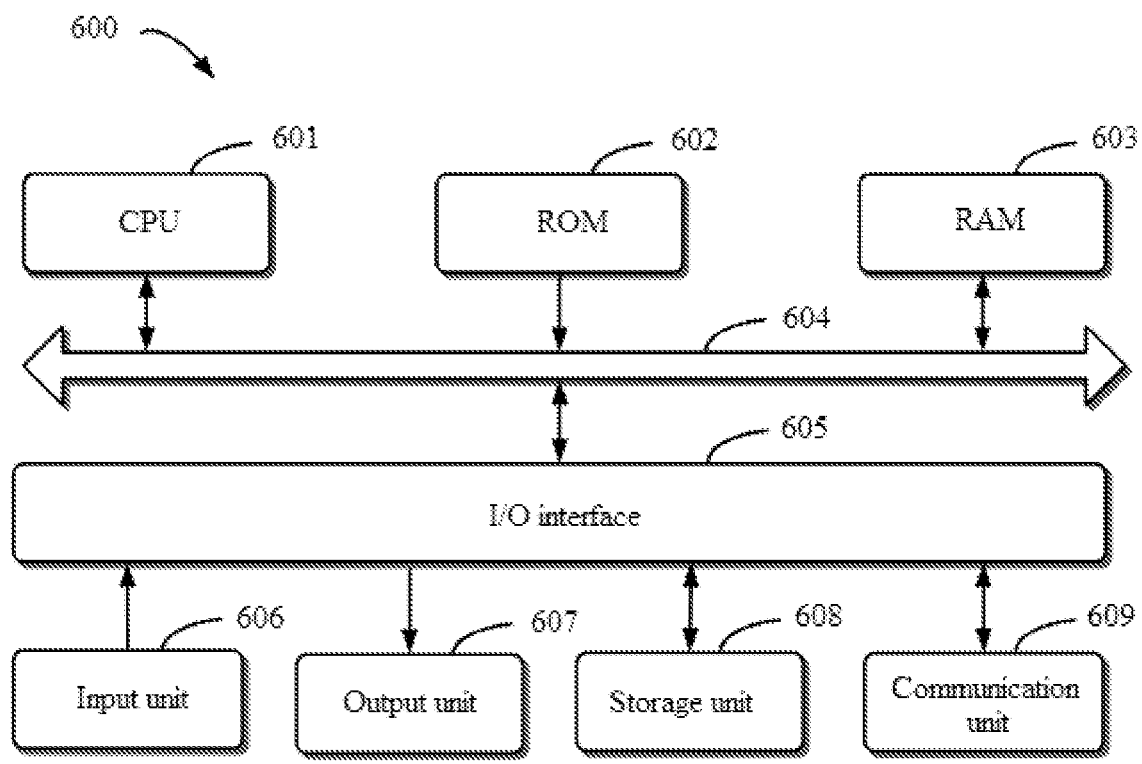
FIG. 6 is a schematic block diagram of an example device that can be configured to implement an embodiment of content of the present disclosure.

FIG. 6 is a schematic block diagram of example device 600 that can be configured to implement an embodiment of content of the present disclosure. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, process 200, 300, and/or 400, may be performed by processing unit 601. For example, in some embodiments, process 200, 300, and/or 400 may be implemented as a computer software program that is tangibly included in a machine-readable medium such as storage unit 608. In some embodiments, some or all of the computer programs may be loaded and/or installed onto device 600 via ROM 602 and/or communication unit 609. When the computer program is loaded into RAM 603 and executed by CPU 601, one or more actions of process 200, 300, and/or 400 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++ as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer may be connected to a user computer over any kind of networks, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The computer-readable program instructions are executable by the electronic circuit to implement various aspects of the present disclosure.

Various aspects of the present disclosure are described here with reference to flowcharts and/or block diagrams of the method, the apparatus (system), and the computer program product implemented according to the embodiments of the present disclosure. It should be appreciated that each block in the flowcharts and/or block diagrams and a combination of blocks in the flowcharts and/or block diagrams may be implemented by computer program instructions.

The computer-readable program instructions may be provided to a processing unit of a general purpose computer, a special purpose computer, or another programmable data processing apparatus to produce a machine such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium, and the instructions cause the computer, or another programmable data processing apparatus, and/or other devices to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams may represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they may be performed in an opposite order sometimes, depending on the functions involved. It also should be noted that each block in the block diagrams and/or flowcharts, and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments, or technical improvements of technologies on the market, or to enable other persons of ordinary skill in the art to understand the embodiments disclosed here.

The invention claimed is:

1. A method for recovering data, comprising:
acquiring metadata corresponding to target data stored in a plurality of storage devices;
dividing the metadata into a first part of metadata and a second part of metadata, wherein the first part of metadata corresponds to a first set of data blocks in the target data and assigned to a first backup storage device in the plurality of storage devices, and the second part of metadata corresponds to a second set of data blocks in the target data and assigned to a second backup storage device in the plurality of storage devices;
acquiring, based on the first part of metadata, the first set of data blocks from the first backup storage device;
acquiring, based on the second part of metadata, the second set of data blocks from the second backup storage device;
determining that one remaining data block of the second set of data blocks failed to be received correctly during the acquiring of the second set of data blocks;

identifying a subset of the second part of metadata that corresponds to the one remaining data block;

acquiring the one remaining data block from the first backup storage device based on the subset of the second part of metadata; and recovering, by at least one processor, the target data based on at least a combination of the first set of data blocks and the second set of data blocks, wherein the second set of data blocks comprise the one remaining data block, and wherein the first set of data blocks and the second set of data blocks are directly used as the target data.

2. The method of claim 1, wherein the dividing is based on one or more characteristics comprising data transmission rates, and wherein acquiring the first set of data blocks from the first backup storage device comprises:

determining the data transmission rates of the plurality of backup storage devices;

determining, from the plurality of backup storage devices, a backup storage device with a data transmission rate greater than a predetermined threshold rate as the first backup storage device; and acquiring, from the first backup storage device, the first set of data blocks corresponding to the first part of metadata.

3. The method of claim 1, wherein the dividing is based on one or more characteristics comprising geographical positions, and wherein acquiring the first set of data blocks from the first backup storage device comprises:

determining the geographical positions of the plurality of backup storage devices;

determining, from the plurality of backup storage devices, a backup storage device from which a distance to a system corresponding to the at least one processor for recovering the target data is greater than a predetermined threshold distance as the first backup storage device; and acquiring, from the first backup storage device, the first set of data blocks corresponding to the first part of metadata.

4. The method of claim 1, wherein acquiring the second set of data blocks from the second backup storage device comprises:

determining, according to determination that the first set of data blocks of the first backup storage device has been acquired, the subset of the second part of metadata that corresponds to the one or more remaining data blocks;

acquiring the one or more remaining data blocks corresponding to the subset of the second part of metadata from the first backup storage device and the second backup storage device respectively; and determining, according to determination that the one or more remaining data blocks of one of the first backup storage device and the second backup storage device have been acquired, the acquired one or more remaining data blocks as a part of the second set of data blocks.

5. The method of claim 1, further comprising:

determining, according to determination that one data block in the first set of data blocks is not received correctly, metadata of the one data block; and acquiring, based on the metadata of the one data block, the one data block from the second backup storage device.

6. An electronic device, comprising:

at least one processor; and at least one memory coupled to the at least one processor and storing instructions configured to be executed by the at least one processor, wherein when executed by the at least one processor, the instructions cause the electronic device to perform actions comprising:

acquiring metadata corresponding to target data stored in a plurality of storage devices;

dividing the metadata into a first part of metadata and a second part of metadata, wherein the first part of metadata corresponds to a first set of data blocks in the target data and assigned to a first backup storage device in the plurality of storage devices, and the second part of metadata corresponds to a second set of data blocks in the target data and assigned to a second backup storage device in the plurality of storage devices;

acquiring, based on the first part of metadata, the first set of data blocks from the first backup storage device;

acquiring, based on the second part of metadata, the second set of data blocks from the second backup storage device;

determining that one remaining data block of the second set of data blocks failed to be received correctly during the acquiring of the second set of data blocks;

identifying a subset of the second part of metadata that corresponds to the one remaining data block;

acquiring the one remaining data block from the first backup storage device based on the subset of the second part of metadata; and recovering the target data based on at least a combination of the first set of data blocks and the second set of data blocks, wherein the second set of data blocks comprise the one remaining data block, and wherein the first set of data blocks and the second set of data blocks are directly used as the target data.

7. The electronic device of claim 6, wherein the dividing is based on one or more characteristics comprising data transmission rates, and wherein acquiring the first set of data blocks from the first backup storage device comprises:

determining the data transmission rates of the plurality of backup storage devices;

determining, from the plurality of backup storage devices, a backup storage device with a data transmission rate greater than a predetermined threshold rate as the first backup storage device; and acquiring, from the first backup storage device, the first set of data blocks corresponding to the first part of metadata.

8. The electronic device of claim 6, wherein the dividing is based on one or more characteristics comprising geographical positions, and wherein acquiring the first set of data blocks from the first backup storage device comprises:

determining the geographical positions of the plurality of backup storage devices;

determining, from the plurality of backup storage devices, a backup storage device from which a distance to a system corresponding to the at least one processor for recovering the target data is greater than a predetermined threshold distance as the first backup storage device; and acquiring, from the first backup storage device, the first set of data blocks corresponding to the first part of metadata.

9. The electronic device of claim 6, wherein acquiring the second set of data blocks from the second backup storage device comprises:
- determining, according to determination that the first set of data blocks of the first backup storage device has been acquired, the subset of the second part of metadata that corresponds to the one or more remaining data blocks;
- acquiring the one or more remaining data blocks corresponding to the subset of the second part of metadata from the first backup storage device and the second backup storage device respectively; and
- determining, according to determination that the one or more remaining data blocks of one of the first backup storage device and the second backup storage device have been acquired, the acquired one or more remaining data blocks as a part of the second set of data blocks.

10. The electronic device of claim 6, wherein the actions further comprise:
- determining, according to determination that one data block in the first set of data blocks is not received correctly, metadata of the one data block; and
- acquiring, based on the metadata of the one data block, the one data block from the second backup storage device.

11. A computer program product tangibly stored in a non-transitory computer storage medium and comprising machine-executable instructions, which when executed by a processor, cause the processor to perform actions, the actions comprising:
- acquiring metadata corresponding to target data stored in a plurality of storage devices;
- dividing the metadata into a first part of metadata and a second part of metadata, wherein the first part of metadata corresponds to a first set of data blocks in the target data and assigned to a first backup storage device in the plurality of storage devices, and the second part of metadata corresponds to a second set of data blocks in the target data and assigned to a second backup storage device in the plurality of storage devices;
- acquiring, based on the first part of metadata, the first set of data blocks from the first backup storage device;
- acquiring, based on the second part of metadata, the second set of data blocks from the second backup storage device;
- determining that one remaining data block of the second set of data blocks failed to be received correctly during the acquiring of the second set of data blocks;
- identifying a subset of the second part of metadata that corresponds to the one remaining data block;
- acquiring the one remaining data block from the first backup storage device based on the subset of the second part of metadata; and
- recovering, by the processor, the target data based on at least a combination of the first set of data blocks and the second set of data blocks, wherein the second set of data blocks comprise the one remaining data block, and wherein the first set of data blocks and the second set of data blocks are directly used as the target data.

12. The computer program product of claim 11, wherein the dividing is based on one or more characteristics comprising data transmission rates, and wherein acquiring the first set of data blocks from the first backup storage device comprises:
- determining the data transmission rates of the plurality of backup storage devices;
- determining, from the plurality of backup storage devices, a backup storage device with a data transmission rate greater than a predetermined threshold rate as the first backup storage device; and
- acquiring, from the first backup storage device, the first set of data blocks corresponding to the first part of metadata.

13. The computer program product of claim 11, wherein the dividing is based on one or more characteristics comprising geographical positions, and wherein acquiring the first set of data blocks from the first backup storage device comprises:
- determining the geographical positions of the plurality of backup storage devices;
- determining, from the plurality of backup storage devices, a backup storage device from which a distance to a system corresponding to the processor for recovering the target data is greater than a predetermined threshold distance as the first backup storage device; and
- acquiring, from the first backup storage device, the first set of data blocks corresponding to the first part of metadata.

14. The computer program product of claim 11, wherein acquiring the second set of data blocks from the second backup storage device comprises:
- determining, according to determination that the first set of data blocks of the first backup storage device has been acquired, the subset of the second part of metadata that corresponds to the one or more remaining data blocks;
- acquiring the one or more remaining data blocks corresponding to the subset of the second part of metadata from the first backup storage device and the second backup storage device respectively; and
- determining, according to determination that the one or more remaining data blocks of one of the first backup storage device and the second backup storage device have been acquired, the acquired one or more remaining data blocks as a part of the second set of data blocks.

15. The computer program product of claim 11, wherein the actions further comprise:
- determining, according to determination that one data block in the first set of data blocks is not received correctly, metadata of the one data block; and
- acquiring, based on the metadata of the one data block, the one data block from the second backup storage device.

16. The method of claim 1, wherein the at least one processor simultaneously acquires the first set of data blocks from the first backup storage device and the second set of data blocks from the second backup storage device.

17. The electronic device of claim 6, wherein the at least one processor simultaneously acquires the first set of data blocks from the first backup storage device and the second set of data blocks from the second backup storage device.

18. The computer program product of claim 11, wherein the at least one processor simultaneously acquires the first set of data blocks from the first backup storage device and the second set of data blocks from the second backup storage device.

* * * * *